July 1, 1958 W. S. PARK 2,841,063
DOUBLE AERIAL CAMERAS
Filed March 10, 1955 3 Sheets-Sheet 1
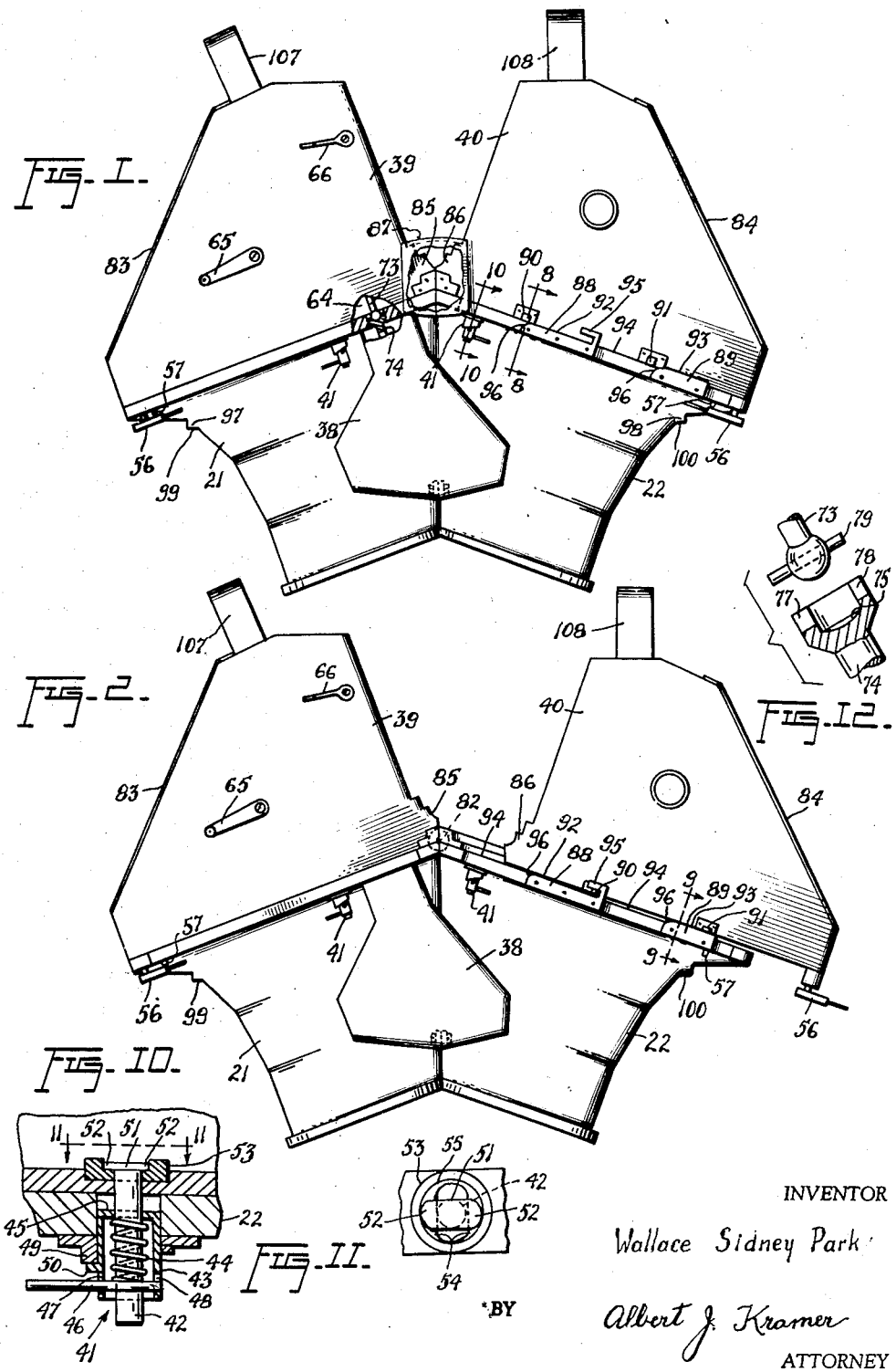
INVENTOR
Wallace Sidney Park
BY Albert J. Kramer
ATTORNEY July 1, 1958 — W. S. PARK — 2,841,063
DOUBLE AERIAL CAMERAS
Filed March 10, 1955 — 3 Sheets-Sheet 2
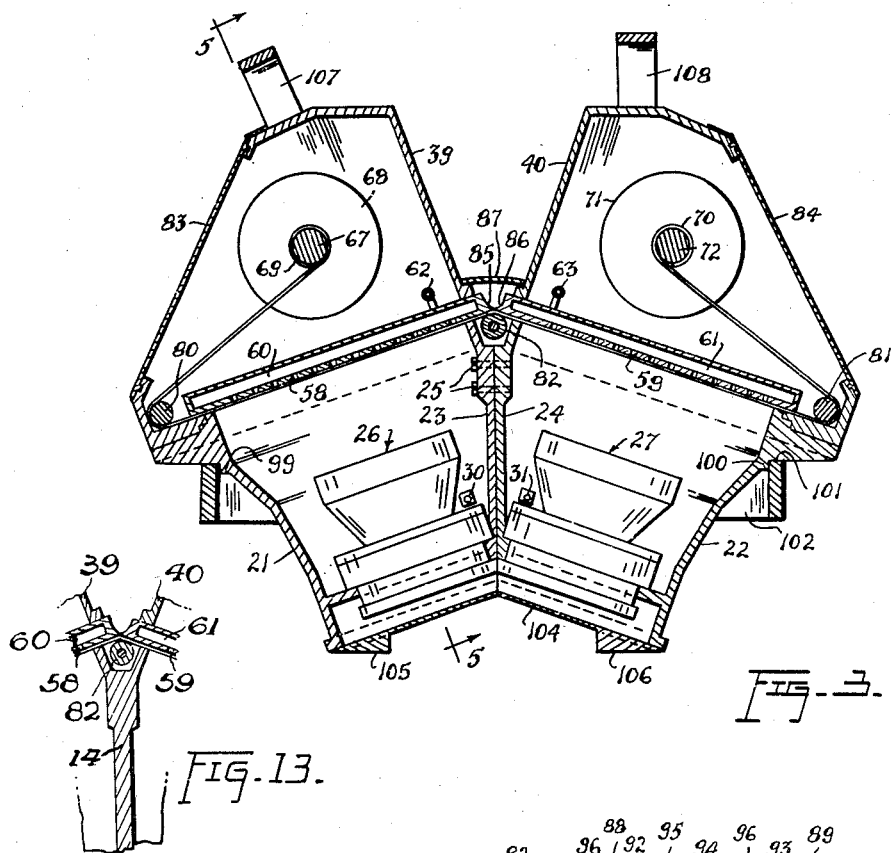
Fig. 3.
Fig. 13.
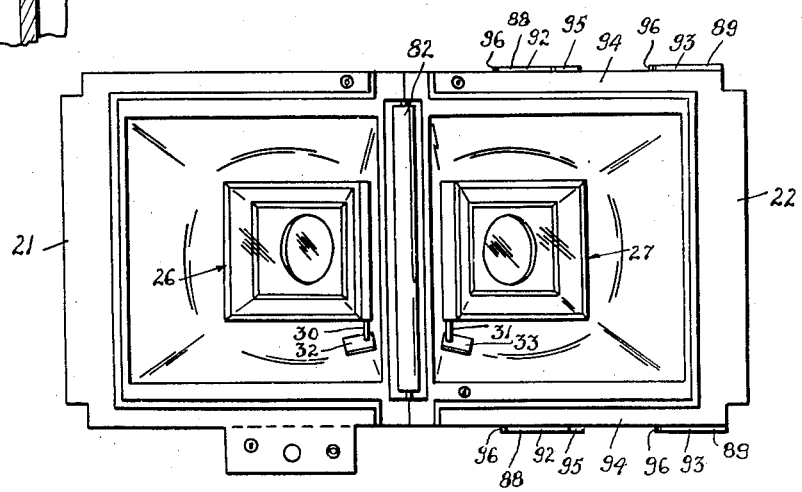
Fig. 4.
INVENTOR
Wallace Sidney Park
BY Albert J. Kramer
ATTORNEY

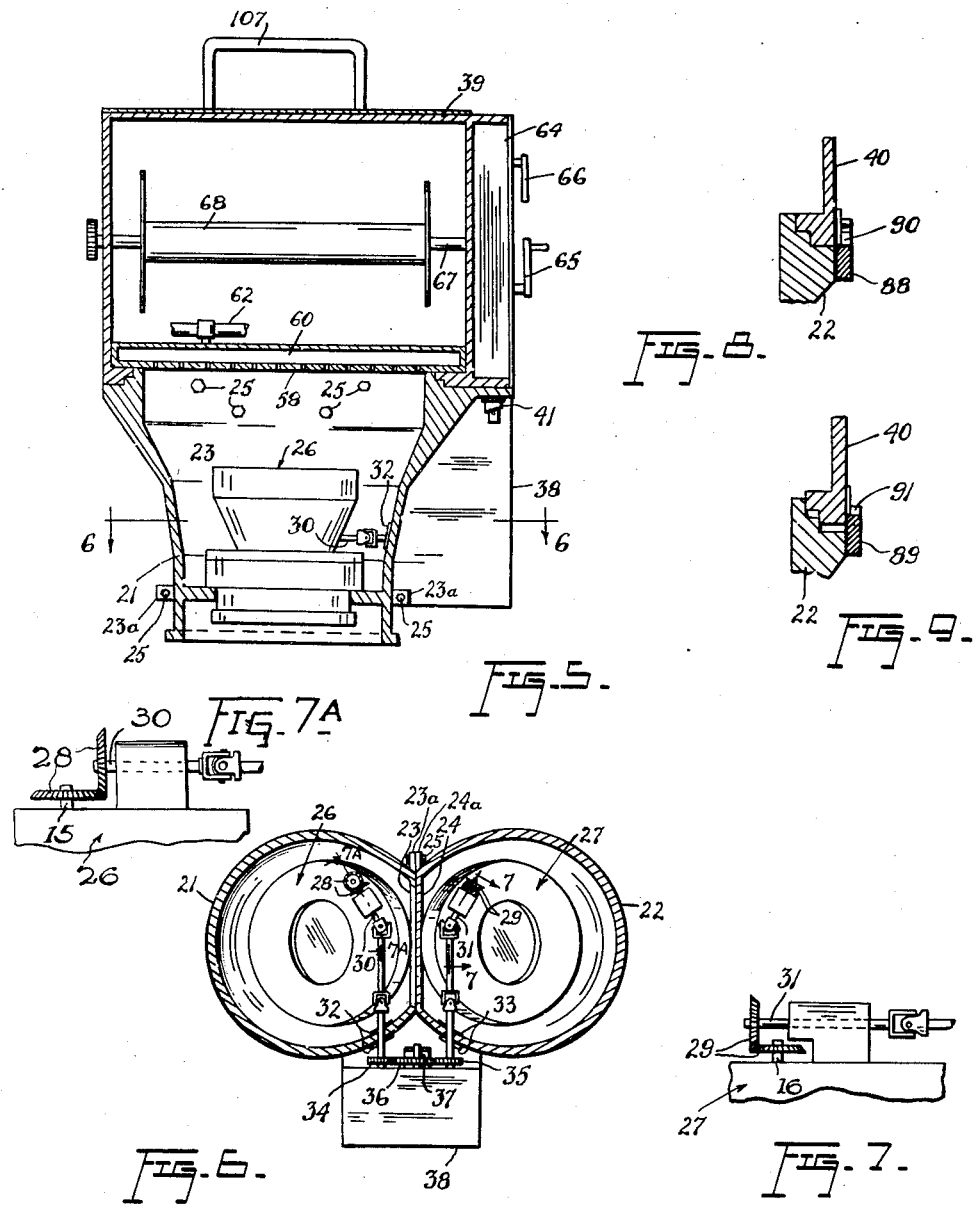

United States Patent Office 2,841,063
Patented July 1, 1958

2,841,063

DOUBLE AERIAL CAMERAS

Wallace Sidney Park, Louisville, Ky.

Application March 10, 1955, Serial No. 493,423

1 Claim. (Cl. 95—12.5)

This invention relates to cameras and is more particularly concerned with aerial cameras used to photograph ground objects from airplanes.

In taking aerial photographs, the camera may be set with its optical axis either vertically or at an angle to the plumb line of the airplane. A vertical position of the camera produces what is termed a "vertical" photograph and the angular position produces what is generally termed "oblique" photographs.

Oblique photographs have an advantage over the vertical photographs of greater ground coverage per photograph for any given altitude of the airplane and for any given camera, thereby reducing the unit cost of an aerial survey.

Attempts have been made to reduce this unit cost even further by using two cameras set on oblique axes with a small overlap and synchronizing the action of the cameras to take a pair of photographs simultaneously, the small overlap being used to provide data for making a composite of the two photographs. In order to do this, however, it is fundamentally necessary to obtain absolutely simultaneous exposures, otherwise a true common overlap would not be obtained and, hence, a correct composite could not be made.

Prior attempts have, in general, consisted essentially in mounting two separate cameras, each having its own wind up and loaded film spools, on a single base unit and providing separate means for driving the mechanism of each camera. Such attempts have not proven wholly satisfactory for a number of reasons and the general object of the present invention is to provide a device which is practical and effective for simultaneously taking pairs of oblique aerial photographs.

In mounting separate cameras on a single base unit, the cameras themselves have substantial weight and tend to induce a degree of deflection in the base member that may affect the proper positioning of the cameras relative to each other. Also, independent cameras set for oblique photography will produce an overlap of increased obliqueness the farther the cameras are from each other and an overlap of more nearly vertical photography, the closer the cameras are to each other. This is important in making up the composite photographs, because the more nearly vertical the photographs of the overlap, the clearer the detail and, hence, the more accurate the composite. However there is a limit to the proximity of independent cameras to each other, the limitation being always the size of the camera housings. Accordingly, another object of the invention is to provide means for decreasing to a minimum the distance between the optical systems of the cameras.

This decreased distance is also important for minimizing relative parallax. It is practically impossible to obtain a true level flight in an airplane. There is always some tilting and tipping. The effect of such tipping and tilting is least at the axes of the airplane about which the tilting and tipping take place. In the case of two cameras, it is obviously not possible to mount them so that both are in the one optimum position available for the purpose of reducing parallax. However, by placing them as close together as possible, the situation is improved, because the parallax is thus reduced.

As indicated above, aerial cameras have substantial weight. They are also bulky and unwieldy and the usual practice is to remove them from the airplane when it is necessary to unload a partially exposed roll of film so that it can be unloaded in a dark room to save the unexposed portion of the roll. An important object of this invention is the provision of means which permits the loading and unloading of film, particularly an exposed portion of a roll of film, without ruining the unexposed portion of the roll of film, while the camera is in place in an airplane and thereby making it possible to permanently install the camera in an airplane.

These and other objects and advantages of the invention will be more fully understood from the following description, considered together with the accompanying drawing.

In the drawing:

Fig. 1 is a side elevational view of an embodiment of the invention, partly broken away.

Fig. 2 is a view similar to Fig. 1 with the unexposed film hood moved to its position for cutting the film strip between the two sections of the camera and the transverse light seal member removed.

Fig. 3 is a vertical cross sectional view of the embodiment.

Fig. 4 is a top plan view of the embodiment with the film hoods removed.

Fig. 5 is a sectional view along the line 5—5 of Fig. 3.

Fig. 6 is a sectional view along the line 6—6 of Fig. 5.

Fig. 7 is a fragmentary elevational view along the line 7—7 of Fig. 6.

Fig. 7A is a fragmentary elevational view along the line 7A—7A of Fig. 6.

Fig. 8 is a sectional view along the line 8—8 of Fig. 1.

Fig. 9 is a sectional view along the line 9—9 of Fig. 2.

Fig. 10 is a sectional view along the line 10—10 of Fig. 1.

Fig. 11 is a plan view of a portion along the line 11—11 of Fig. 10.

Fig. 12 is an enlarged fragmentary view of the two parts of a certain shaft coupling.

Fig. 13 is a fragmentary view illustrating a modification of the invention.

Referring with more particularity to the drawing in which like numerals designate like parts, the embodiment illustrated comprises two camera optical housing sections 21 and 22 of generally inverted frustro-conical shape, each having on one side thereof, a flat wall 23 and 24, respectively, which makes an angle with the optical axis of its corresponding housing section equal to the angle of obliquity desired.

The flat walls 23 and 24 are placed in mutually abutting relationship and they are secured together with bolts 25 passing through said walls and also through extension lobes 23A and 24A, or by any other suitable means. Alternatively, the walls 23 and 24 may be a single wall 14 common to both housing sections and cast integral with the housing as a single unit as shown in Fig. 13.

Each housing section 21 and 22 comprises a chamber or compartment which contains the usual optical members, generally designated in the drawings by the numerals 26 and 27, respectively, including the usual power driven shutters actuated through shafts 15 and 16, pairs of bevel gears 28 and 29, and shafts 30 and 31.

The shafts 30 and 31 project through apertures in the walls of the housing sections, suitable light seals 32 and 33 being provided for the apertures, and each shaft is provided with a gear 34 and 35, respectively. A pinion 36, mounted on shaft 37, meshes with both of the gears 34 and 35. The shaft 37 is powered through a transmission in a housing 38 on the side of the instrument of the usual type known to the art for intermittently actuating camera shutters, this being well known in the art and no part of the present invention.

It is preferred that the two shutter mechanisms be actuated together in opposite directions for inertia balance. This may be effective in many different ways. One such way being illustrated in the drawings and consisting in meshing the beveled gears 29 in diagrammatically opposite position to that of the beveling gears 28 as illustrated by the two views of Figs. 7 and 7A.

The sections 21 and 22 comprising the chambers or compartments referred to above, are each surmounted by a film spool hood 39 and 40, respectively. These hoods are removably secured in place by means of locking clamps 41, or by any other suitable means. The locking clamps illustrated comprise each a vertical shaft 42 disposed in a vertically and rotatably movable sleeve 43 in the housing 22. The shaft 42 is normally urged downwardly by a coil spring 44 in the sleeve 43. The upper end of the spring 44 is adjacent the upper end wall 45 of the sleeve and the lower end of the spring rests on a horizontal pin 46. The pin 46 passes through an aperture in the shaft 42 and engages a pair of diametrically disposed vertical slots 47 and 48 on either side of the shaft 42 in the wall of the sleeve 43. A cylindrical cam 49 is disposed about the sleeve 43 and is engaged by a follower in the form of an outwardly projecting stub pin 50 of the sleeve. Accordingly, by rotating the sleeve, the action of the cam 49 is effective to force it downwardly and shorten the height of the spring 44 which increases the tension thereof to increase the downward force on the pin 46 and shaft 42.

The top of the shaft carries a head 51 having one or more outwardly extending arms 52 and the hood 40 has a socket 53 with an aperture 54 of a shape and size corresponding thereto to permit the passage of the head 51 therethrough. The socket 53 also has an upwardly facing shoulder 55 which is adapted to engage the arms 52. By these means the shaft 42 can be removed upwardly to pass the head 51 through the aperture 54, whereupon when it is turned with the sleeve 53 to increase tension in the spring, the head rests upon the shoulder and the resulting force applied by the spring to the shaft is effective to hold the housing and hood together under resilient tension.

Auxiliary securing means are provided at the ends of the hoods in the form of rotatable latch arms 56 on the hoods 39 and 40 which engage in their closed positions, buttons 57 on the sections 21 and 22. The bottom of the hoods are each provided with a perforated platen 58 and 59, respectively, each forming the bottom wall of a flat plenum chamber 60 and 61, respectively, secured to the walls of the hoods. These plenum chambers are connected to a source of vacuum (not shown) through pipes 62 and 63 and the usual automatically operated valves (not shown) located in a compartment 64 on the side of the hood 39. This compartment also contains a conventional type of wind up mechanism (not shown) which is no part of the present invention, powered by a hand crank 65 and tripped for each cycle of operation by a trip lever 66, thereby intermittently rotating the shaft 67 upon which the take up spool 68 for the exposed film roll 69 is mounted, the crank and lever being integral parts of the mechanism. The other hood 40 contains the unexposed roll of film 70 on the spool 71 mounted on a shaft 72. Hence, each hood contains, exclusively, only one or the other, but not both, of the two film spools involved.

Power to drive the mechanism in the housing 38 is provided by a shaft 73 in the compartment 64 which drives a shaft 74 in the housing 38 through a coupling consisting of a socket 75 on the end of the shaft 74 having slots 77 and 78 which removably engage the outwardly projecting ends of a pin 79 on the shaft 73.

Each hood is provided with an interior roller 80 and 81, respectively, at the outer ends of each plenum chamber 60 and 61 for supporting the film in a flat condition at right angles to the optical axes of the lens systems, respectively, between the rollers. The film unwinds from the spool 71, passes around the roller 81, beneath the platen 59, thence over an intermediate roller 82 disposed between the two sections, thence beneath the platen 58, around the roller 80 and finally to the wind up spool 68.

The hoods are each provided with a hinged door 83 and 84, respectively, for loading and unloading the camera. The bottom inner end edges of the hoods have projecting shoulders 85 and 86 which are normally in mutually abutting relation over the intermediate roller 82. A removable light shield 87 is placed over this joint transversely between the two hoods.

The hood 40 is slidably mounted on the housing section 22 for displacement relative thereto a short distance from the other hood 39, as shown in Fig. 2. This is effected by means of a pair of short forward tracks 88 and a pair of short rearward tracks 89 on the sides of the housing 22 in combination with corresponding glide pins 90 and 91 or other suitable members, such as rollers, secured to the hood 40. The upper edges 92 and 93 of these tracks are above the plane of the edge 94 of the housing 22, so that when the pins 90 and 91 rest on the tracks, the hood 40 is elevated from its normal position on the housing section 22 in an amount sufficient to permit it to slide freely relative thereto. This slidable movement, however, is limited by a hook portion 95 on each of the forward tracks to engage the pins 90 and 91. The forward ends of all the tracks are provided with a curved camming edge 96 to facilitate engaging the pins therewith and to prevent a too sudden drop therefrom when the hood is moved to its closed position.

By so displacing the hood, the film is exposed and can be severed at a point between the two rollers 80 and 81 and the exposed film can then be removed without disturbing the unexposed film. Subsequently, photographing can be continued with the unexposed film without removing the camera from the plane. This makes it unnecessary to expose an entire spool of film before unloading the camera or to take the camera bodily to a dark room for the purpose of unloading a partially exposed roll of film.

The cycle of operation of the camera is substantially the same as that of single lens aerial cameras of the same type wherein the shutter is actuated by the shutter actuating mechanism in the side housing 38 in synchronization with the film winding and vacuum control mechanism in the compartment 64, except that the timing is regulated to provide for a fresh length of unexposed film in each cycle to cover both of the platens 58 and 59, instead of just one, and the vacuum source is connected to both plenum chambers 60 and 61, so that the film is held tightly against both platens simultaneously when the shutters are actuated.

The sections 21 and 22 are provided with portions 97 and 98, having downwardly facing shoulders 99 and 100 for supporting the device on the edge 101 of a ring mount 102 in the fuselage of an airplane, or in some other suitable place. It is obvious that the size of this opening is much less than what would be required if the camera housing sections were separate rather than condensed and fixed together as shown. In actual practice, the size of the opening is a limiting factor. There is a limit to the size of such an opening that can be provided in any given airplane. Larger size openings require larger size airplanes for that purpose alone, irrespective of any other factors, and even though a smaller size airplane might be wholly sufficient for a particular job to be done. Heretofore, this has meant an increased cost in aerial surveying because of the necessity of using larger and more expensive airplanes. With the present invention, less expensive airplanes can be used and yet better results can be obtained.

A bottom cover plate 104 is removably fitted against the bottom of the housing and is provided with wedge shaped edges 105 and 106 at the outer ends. This permits placing the device on a horizontal surface when it is removed from the airplane.

Handles 107 and 108 are also provided on the hoods 58 and 59 for carrying them independently of the housing sections.

Having thus described my invention, I claim:

A double aerial camera comprising a camera housing, means separating said housing into two lens sections, a removable film spool hood surmounting each of said sections, said hoods being independent of each other and having open bottoms adjacent their corresponding lens sections, one of said hoods being normally for housing a roll of unexposed film and the other for housing a complementary roll of exposed film continuous therewith, members forming a vacuum plenum chamber in each of said hoods, said members including a perforated platen for each hood at right angles to the lens axis of its corresponding housing section, means for supporting a continually moving strip of film across the bottom of both of said platens, said means including a roller between said sections, wall members surrounding said roller, said wall members including portions projecting from said hoods and normally mutually abutting each other, means for separating said portions to expose for severing film carried by the roller, a lens shutter shaft in each section, a train of gears for driving each of said shafts, each train having a terminal gear, a single gear in meshed relation with both of said terminal gears, and a powered shaft for driving said single gear.

References Cited in the file of this patent

UNITED STATES PATENTS

| | | |
|---|---|---|
| 1,187,895 | Folmer | June 20, 1916 |
| 1,536,335 | Folmer | May 5, 1925 |
| 1,559,400 | Bagley et al. | Oct. 27, 1925 |
| 1,890,074 | Briechle et al. | Dec. 6, 1932 |

FOREIGN PATENTS

| | | |
|---|---|---|
| 322,224 | Germany | Aug. 20, 1920 |
| 508,386 | Great Britain | June 30, 1939 |